US012001564B2

(12) United States Patent
Rioux et al.

(10) Patent No.: US 12,001,564 B2
(45) Date of Patent: Jun. 4, 2024

(54) RUNTIME APPLICATION MONITORING WITHOUT MODIFYING APPLICATION PROGRAM CODE

(71) Applicant: Veracode, Inc., Burlington, MA (US)

(72) Inventors: Christien R. Rioux, Somerville, MA (US); Robert Anthony Layzell, Novato, CA (US)

(73) Assignee: Veracode, Inc., Burlington, VT (US)

( * ) Notice: Subject to any disclaimer, the term of this patent is extended or adjusted under 35 U.S.C. 154(b) by 510 days.

(21) Appl. No.: 17/287,057

(22) PCT Filed: Apr. 24, 2020

(86) PCT No.: PCT/US2020/029718
§ 371 (c)(1),
(2) Date: Apr. 20, 2021

(87) PCT Pub. No.: WO2021/216081
PCT Pub. Date: Oct. 28, 2021

(65) Prior Publication Data
US 2022/0075876 A1    Mar. 10, 2022

(51) Int. Cl.
*G06F 11/00* (2006.01)
*G06F 11/30* (2006.01)
(Continued)

(52) U.S. Cl.
CPC .......... *G06F 21/577* (2013.01); *G06F 11/302* (2013.01); *G06F 11/3093* (2013.01); *G06F 11/3612* (2013.01)

(58) Field of Classification Search
CPC ............... G06F 11/302; G06F 11/3093; G06F 11/3612; G06F 11/3466
See application file for complete search history.

(56) References Cited

U.S. PATENT DOCUMENTS 7,779,422 B1 *   8/2010   Dalcher ................ G06F 9/4486
                                                        717/124
9,268,945 B2     2/2016   Williams et al.
(Continued)

OTHER PUBLICATIONS

DE Application No. 10 2021 110 515.3, Office Action, dated Jan. 25, 2022, 5 pages.
(Continued)

*Primary Examiner* — Amine Riad
(74) *Attorney, Agent, or Firm* — Gilliam IP PLLC

(57) ABSTRACT

To facilitate runtime monitoring and analysis of an application without modifying the actual application code, an agent monitors and analyzes an application through detection and evaluation of invocations of an API of a runtime engine provided for execution of the application. The agent registers to receive events which are generated upon invocation of target functions of the runtime engine API based on its load. Once loaded, the agent initially determines the language and language version number of the runtime engine. The agent determines associations of events for which to monitor and corresponding analysis code to execute upon detection of the invocations based on the language and version number information. When the agent detects an event during execution of the application based on invocations of the runtime engine API, the agent can monitor and analyze execution of the application based on execution of analysis code corresponding to the detected event.

20 Claims, 6 Drawing Sheets

(51) Int. Cl.
*G06F 11/36* (2006.01)
*G06F 21/57* (2013.01)

(56) References Cited

U.S. PATENT DOCUMENTS

| | | | |
|---|---|---|---|
| 10,069,827 B2* | 9/2018 | Low | H04L 63/0884 |
| 11,736,499 B2* | 8/2023 | Singh | G06F 21/552 |
| | | | 726/23 |
| 2006/0075045 A1 | 4/2006 | Wei et al. | |
| 2008/0276227 A1 | 11/2008 | Greifeneder | |
| 2008/0288962 A1 | 11/2008 | Greifeneder et al. | |
| 2009/0249368 A1 | 10/2009 | Needamangala et al. | |
| 2013/0074049 A1 | 3/2013 | Gounares et al. | |
| 2014/0289743 A1 | 9/2014 | Degirmenci et al. | |
| 2019/0243964 A1* | 8/2019 | Shukla | G06F 21/54 |

OTHER PUBLICATIONS

"JVM(TM) Tool Interface 1.2", Jun. 19, 2013, [online] retrieved on Jan. 25, 2022 from <https://docs.oracle.com/javase/8/docs/platform/jvmti/jvmti.html>, 134 pages.

Egele, et al., "A Survey on Automated Dynamic Malware-Analysis Techniques and Tools", ACM Computing Surveys, vol. 44, No. 2, Article 6, Feb. 2012, 42 pages.

Hunt, et al., "Detours: Binary Interception of WIN32 Functions", Proceedings of the 3rd USENIX Windows NT Symposium, Seattle, Washington, USA, Jul. 12-13, 1999, 10 pages.

PCT Application Serial No. PCT/US2020/029718, International Search Report, dated Jul. 9, 2020, 2 pages.

PCT Application Serial No. PCT/US2020/029718, Written Opinion, dated Jul. 9, 2020, 6 pages.

Perera, "Using a Java Agent to Monitor Application Runtime Behavior Using Metrics", Medium, 2017, 6 pages.

* cited by examiner

RUNTIME APPLICATION MONITORING WITHOUT MODIFYING APPLICATION PROGRAM CODE

TECHNICAL FIELD

The disclosure generally relates to the field of data processing, and to software development, installation, and management.

BACKGROUND ART

An application can be instrumented to facilitate analysis of the application during execution. Instrumentation code may be added to an application for application monitoring and diagnosing of performance issues. An application is instrumented by inserting instrumentation code at any level of the application code, such as at the level of the application source code, binary code, or bytecode. For instance, one approach to instrumentation of an application at runtime is through insertion of bytecode instrumentation into Java® bytecode at runtime with the Java Instrumentation application programing interface (API). Instrumentation which is added to an application can be added by an agent and/or configured to report data gathered from the application during execution to an agent or other service which is monitoring the application.

BRIEF DESCRIPTION OF THE DRAWINGS

Embodiments of the disclosure may be better understood by referencing the accompanying drawings.

DESCRIPTION OF EMBODIMENTS

Figure 1:
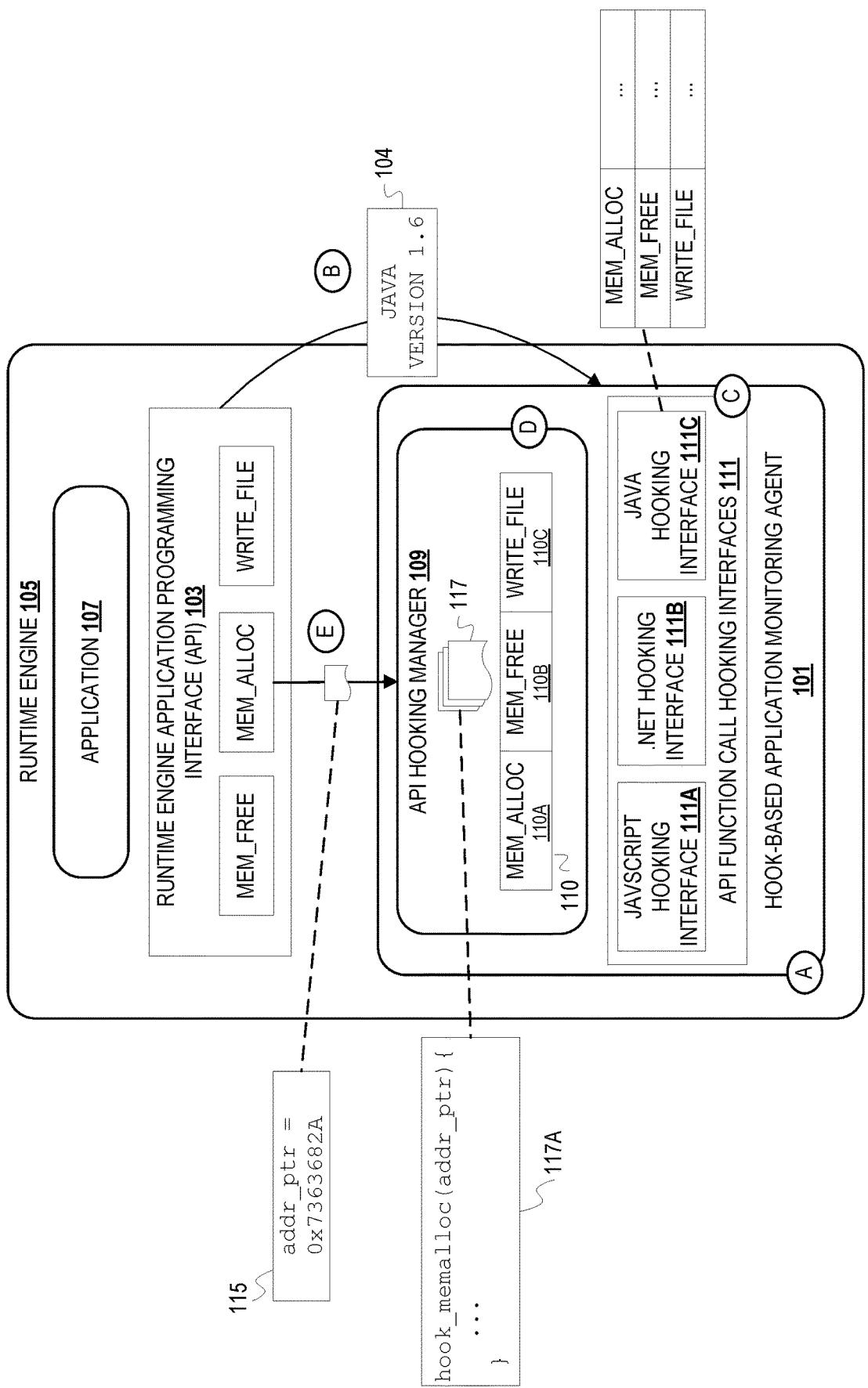
FIG. 1 depicts a conceptual diagram of runtime application monitoring and analysis without modifying code units of the application.

The description that follows includes example systems, methods, techniques, and program flows that embody aspects of the disclosure. However, it is understood that this disclosure may be practiced without these specific details. For instance, this disclosure refers to inserting code hooks into code units of an API of a runtime engine provided for execution of Java applications, applications written in the JavaScript® programming language, and .NET applications in illustrative examples. Aspects of this disclosure can be also applied to a runtime engine and corresponding API provided for execution of an application written in any programming language for which runtime insertion of hooks into code units of the API can be supported. In other instances, well-known instruction instances, protocols, structures and techniques have not been shown in detail in order not to obfuscate the description.

Overview

Conventional instrumentation techniques involve insertion of program code into the application code, such as the application source code or binary code, which modifies the original application code as a result. Execution of the application may thus be impacted and may deviate from the intended execution behavior. To facilitate runtime monitoring and analysis of an application without modifying the actual application code, an agent has been developed which can monitor and analyze an application through detection and evaluation of invocations of an API of a runtime engine provided for execution of the application. The agent "hooks into" the runtime engine API rather than the code of the application executing in the runtime engine by registering to receive events which are generated upon invocation of target functions of the runtime engine API, thereby preserving the original application code and the intended execution behavior while still facilitating analysis of the application. To reduce the administrative overhead traditionally associated with download and installation of an agent per programming language, functionality of the agent for analyzing and monitoring the application is agnostic to the language and version of the language associated with the runtime engine, thus providing a "universal" agent.

Once loaded, the agent initially determines the language and language version number associated with the runtime engine and its API. The agent maintains a listing of language and language version number-specific API function calls for which the agent is to monitor to facilitate interfacing with any of several potential runtime engine target languages. The agent can determine the associations of events (i.e., target function invocations) for which to monitor with the corresponding analysis code to execute upon detection of the invocations for the runtime engine API based on the language and version number information. The agent then monitors for the API function calls, which the agent can detect as events, instead of modifying the application code. When the agent detects an event during execution of the application code based on invocations of the runtime engine API, the agent can monitor and analyze execution of the application based on execution of analysis code corresponding to the detected event. Execution of the application can thus be monitored and analyzed without modification of the code of the application under analysis.

Example Illustrations

FIG. 1 depicts a conceptual diagram of runtime application monitoring and analysis without modifying code units of the application. An application 107 is loaded into a runtime engine 105 for execution. The runtime engine 105 manages execution of the application 107 and provides resources for execution of the application 107. The runtime engine 105 may be any runtime engine for a respective language of the application 107, such as a Java Virtual Machine (JVM) for a Java application, a Common Language Runtime (CLR) for a .NET application, a JavaScript engine for a JavaScript application, etc. The runtime engine 105 provides a runtime engine API ("API") 103 for interfacing with the runtime engine 105. The API 103 can be invoked during execution of the application 107 as the runtime engine 105 performs operations to manage the execution of the application 107 (e.g., memory management, garbage collection, class loading, etc.). Code units of the underlying implementation of the API 103 may be maintained in a library, a collection of libraries, etc. As used herein, the API 103 refers to the function calls specified in the API for the runtime engine 105 and the underlying implementations thereof. FIG. 1 also depicts a hook-based application monitoring agent ("agent") 101 which monitors execution of the application 107 within the runtime engine 105. Functionality of the agent 101 for monitoring and analyzing the application 107 is agnostic to the language and language version number of the runtime engine 105, the API 103, and the application 107. For instance, the operations described herein are applicable if the agent 101 is loaded into a CLR to monitor execution of a .NET application, a JVM to monitor execution of a Java application, etc. FIG. 1 is annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, during creation of a process in which the runtime engine 105 is launched for execution of the application 107, the agent 101 is loaded into the runtime engine 105. The agent 101 may be loaded into the runtime engine 105 as a result of execution of a script to load or include the module via a command line which loads the agent 101 into the same process as the runtime engine 105. Upon load of the agent 101, the agent 101 and the application 107 can execute in parallel or concurrently. In implementations where the runtime engine 105 is a runtime engine for an interpreted language, the agent 101 may generally be loaded by specifying the agent 101 as an argument or parameter in a command for loading a module (e.g., with a parameter indicating the agent 101 as a module name). For example, in implementations in which the runtime engine 105 is a JavaScript engine, the agent 101 can be preloaded as a module based on executing a "require" script in which the agent 101 is indicated in the arguments (e.g., with an argument specifying a module name of the agent 101). In other implementations in which the runtime engine 105 is a runtime engine for a compiled language, the agent 101 can be loaded into the runtime engine 105 by injecting code units of the agent 101 into the process in which the runtime engine 105 launched, such as by implementing the agent 101 as a dynamic link library (DLL) which the runtime engine 105 loads. For example, in implementations in which the runtime engine 105 is a JVM, the agent 101 can be loaded by setting a "libagent" property to true to launch the agent 101 as a native agent which can interface with the JVM (e.g., via the JVM Tool Interface). The agent 101 can receive notifications of events (i.e., invocations of the API 103) as a result of configuration of the agent 101 upon load. For instance, the agent 101 can receive events via the JVM Tool Interface as a result of loading the agent as a native agent.

At stage B, the agent 101 determines runtime engine language information 104. The runtime engine language information 104 indicates the language and language version number associated with the runtime engine 105 and API 103. The agent 101 may determine the language of the runtime engine 105 based on the method by which the agent 101 was loaded into the runtime engine 105 and/or based on execution of stubs (i.e., method stubs) maintained for potential languages of the runtime engine 105. For instance, the agent 101 can determine the language of the runtime engine 105 based on parameters or arguments of the command script by which the agent 101 was loaded which are maintained as metadata for the runtime engine 105 and/or the agent 101 (e.g., by identifying that the agent 101 was loaded with a "libagent" property set to true). Additionally, the agent 101 can maintain stubs for potential languages of the runtime engine 105 and associated API 103, where the stubs correspond to methods, functions, etc. which the runtime engine 105 may call upon load of the agent 101. The agent 101 may then determine the language of the runtime engine 105 by determining the language of the stub(s) which executed as a result of loading the agent 101 into the runtime engine 105 (e.g., based on identifying a return value which was returned as a result of executing the stub(s) of the corresponding language). Once the agent 101 has determined the language, the agent 101 can determine the language version number based on calling a function of the API 103. For instance, the agent 101 may call a function of the API 103 which returns a version number of the language of the runtime engine 105. In this example, the agent 101 obtains runtime engine language information 104 by first determining that the runtime engine 105 is a JVM (e.g., based on determining that the value of the libagent property is true) and subsequently determining that the JVM corresponds to version 1.6 of Java based on calling a function of the API 103 to determine the version number.

At stage C, the agent 101 determines hooks to create for function calls of the API 103 based on the runtime engine language information 104. Creation of hooks refers to the agent 101 associating indications of target function calls of the API 103, or events, which should be monitored for during subsequent execution of the application 107 and the one or more corresponding analysis code unit(s) to be executed upon detecting the event. Hooks may be implemented as an event listener of the agent 101 which listens for invocations of the API 103 corresponding to one of the hooks and the associated event handler(s). As another example, hooks can be implemented as callback functions which are registered such that the agent 101 detects an event upon invocation of a callback. The agent 101 maintains API function call hooking interfaces ("hooking interfaces") 111 for a plurality of supported languages and language version numbers to facilitate creation of hooks by the agent 101 for any potential language and language version number such that the agent 101 can interface with any supported runtime engine. Each of the hooking interfaces 111 relate the target function calls of the API 103 for which the agent 101 is to monitor for the respective language and language version number to the underlying agent 101 representation of the target function calls. For instance, each of the hooking interfaces 111 can comprise a header file(s) corresponding to each language and language version number which includes stubs corresponding to each target function. In this case, the agent 101 implements the functionality underlying the target functions indicated in the header file(s) for a hooking interface which is to be invoked upon detection of the corresponding event such that the functionality of the agent 101 can be invoked upon detecting an invocation of a target function call of the API 103.

In this example, the hooking interfaces 111 include a JavaScript hooking interface 111A, a .NET hooking interface 111B, and a Java hooking interface 111C, though the agent 101 may maintain additional hooking interfaces for one or more versions of other languages and/or additional versions of the depicted languages. Each of the hooking interfaces 111 (i.e., the JavaScript hooking interface 111A, .NET hooking interface 111B, and Java hooking interface 111C) indicate target function calls of the API 103, or the function calls of the API 103 for which the agent 101 should create hooks, which should trigger execution of a respective analysis code unit(s) of analysis code units 117 maintained by the agent 101.

In this example, each of the hooking interfaces 111 indicate target function calls of memory allocation, memory deallocation, and writing to a file, where the indicated implementations of the target functions correspond to the language and language version number of the respective one of the hooking interfaces 111. For example, the target function call for memory allocation can be invoked when the runtime engine 105 allocates memory as program code of the application 107 for set operations (e.g., assignment), calls to constructors, etc., is executed. As another example, the target function call for memory deallocation can be invoked as memory is freed during garbage collection. The agent 101 determines which of the hooking interfaces 111 to leverage for insertion of hooks based on the runtime engine language information 104. In this example, the agent 101 examines the runtime engine language information 104 and determines that the API 103 corresponds to Java version 1.6. The agent 101 can then access the Java hooking interface 111C, which indicates the function calls for handling memory allocation, memory deallocation, and writing to a file per the specification of the API 103 corresponding to version 1.6 of Java. The agent 101 determines that a hook 110A, a hook 110B, and a hook 110C (collectively the "hooks 110A-C") which correspond to the target functions indicated in the Java hooking interface 111C should be created.

At stage D, an API hooking manager ("hooking manager") 109 of the agent 101 creates the hooks 110A-C based on the Java hooking interface 111C and corresponding ones of the analysis code units 117. The hooking manager 109 creates the hooks 110A-C corresponding to each of the target function calls indicated in the Java hooking interface 111C. In this example, the hooking manager 109 creates the hooks 110A, 110B, 110C corresponding to the function calls of the API 103 for memory allocation, memory deallocation, and writing to a file, respectively. Each of the hooks 110A-C associates the target function call with at least a first of the analysis code units 117 maintained by the agent 101 which should execute based on detecting that a call has been made to the respective target function of the API 103. For instance, the agent 101 may create the hooks 110A-C by associating the target function call corresponding to the event and the corresponding one of the analysis code units 117 which handles the event (e.g., based on pointers to the target function call and the corresponding analysis code unit). As another example, the hooks 110A-C may be implemented through callbacks which the hooking manager 109 registers. In this example, each of the callbacks comprises a corresponding one of the analysis code units 117, and creation of the hooks 110A-C refers to registration of the callbacks by the hooking manager 109.

At stage E, the agent 101 detects that an invocation of the target function of the API 103 for memory allocation which corresponds to the hook 110A has occurred. During execution of the application 107, the agent 101 detects invocations of the target functions of the API 103 as events. The agent 101 can detect events based on the language of the runtime engine 105 and/or based on the implementation of the hooks 110A-C. For instance, the agent 101 may be invoked upon detection of an event by an event listener or upon invocation of a callback which was registered during creation of the hooks 110A-C. Upon invocation of the target function of the API 103 for memory allocation and subsequent detection of the corresponding event, the agent 101 determines a corresponding one of the analysis code units 117 maintained for memory allocation events, depicted in FIG. 1 as an analysis code unit 117A, which is to execute. Each of the analysis code units 117 can indicate operations to perform as a result of the invocation of a respective target function of the API 103. For instance, an analysis code unit 117A can comprise instructions for storing a pointer to the start address of memory being allocated, determine the source which allocated the memory, etc. The data about the memory allocation event which the agent 101 obtains as a result of detecting the event is depicted in FIG. 1 as execution information 115. The agent 101 can obtain the execution information 115 based on detecting the event corresponding to the API 103 invocation. For instance, the execution information 115 may be passed as a parameter to a callback or event listener maintained by the agent 101.

The agent 101 can then execute the analysis code unit 117A which corresponds to the hook 110A. For instance, the agent 101 can then generate an indicator of the memory allocation event which was detected based on the execution information 115 as a result of executing the analysis code unit 117A. Alternatively or in addition, the agent 101 may perform subsequent analysis of the event based on the execution information 115 as a result of executing the analysis code unit 117A. For instance, the agent 101 can analyze the execution information 115 to detect a vulnerability of the application 107. As an example, the agent 101 may maintain a rule(s) for vulnerability detection. The analysis code unit 117A can also comprise instructions to analyze the execution information 115 to determine if the execution information 115 satisfies the rule(s) for vulnerability detection to determine if the application 107 comprises an application vulnerability. The agent 101 can thus monitor and analyze execution of the application 107 and/or detect vulnerabilities based on calls to target functions of the API 103 for which the hooks 110A-C were created and executing corresponding ones of the analysis code units 117 maintained by the agent 101 without instrumenting the application 107 itself.

Figure 2:
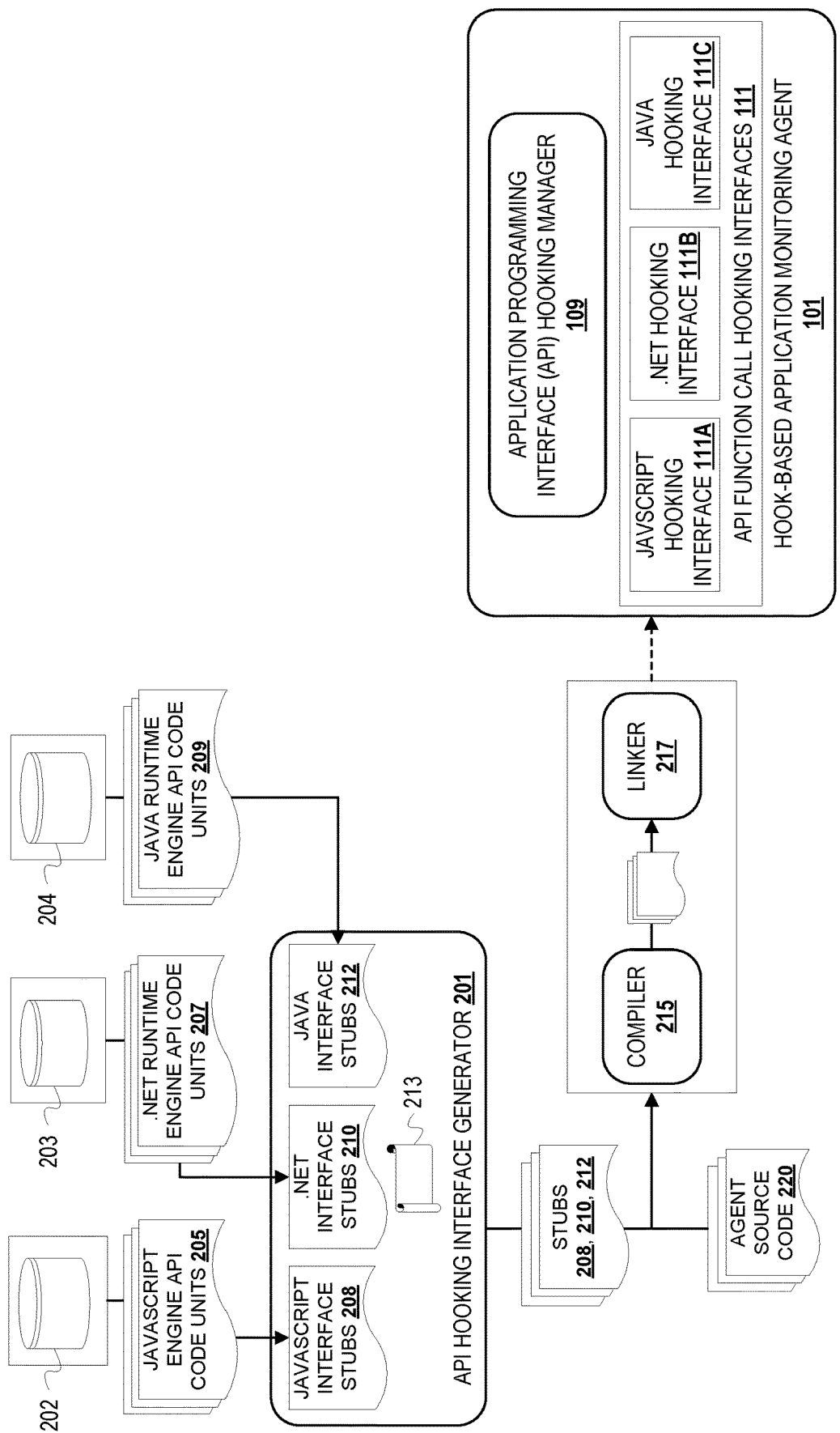
FIG. 2 depicts a conceptual diagram of generating hooking interfaces for a plurality of languages and language version numbers to facilitate monitoring for invocations of a runtime engine API.

FIG. 2 depicts a conceptual diagram of generating hooking interfaces for a plurality of languages and language version numbers to facilitate monitoring for invocations of a runtime engine API. FIG. 2 depicts the agent 101 which maintains hooking interfaces 111 for creation of hooks corresponding to target function calls of a JavaScript engine API, a .NET API, and a Java API as described in reference to FIG. 1, where each of the JavaScript engine API, .NET API, and Java API comprise an API provided by the respective runtime engine. An API hooking interface generator ("hooking interface generator") 201 generates a hooking interface for each language and language version number which the agent 101 supports for runtime application monitoring and analysis. A hooking interface generated for a language and language version number can comprise a plurality of stubs which correspond to the target function calls which the agent 101 can detect as events during execution of an application. In this example, the hooking interface generator 201 generates JavaScript interface stubs 208, .NET interface stubs 210, and Java interface stubs 212 (collectively referred to herein as the "hooking interface stubs 208, 210, 212"). The hooking interface stubs 208, 210, 212 indicate target function calls of the respective API for which the agent 101 will monitor. For instance, each stub included in the hooking interface stubs 208, 210, 212 can indicate the function name, parameters, return type, etc. for the corresponding target function call. Though FIG. 2 depicts the hooking interface generator 201 as generating hooking interface stubs for target function calls for one version each of the JavaScript engine API, .NET API, and Java API, the hooking interface generator 201 can generate stubs for one or more versions of other languages and/or additional versions of the depicted languages.

The hooking interface generator 201 can generate hooking interface stubs 208, 210, 212 based on code units of the JavaScript engine API, .NET API, and Java API which are accessible to the hooking interface generator 201. In this example, the hooking interface generator 201 generates the hooking interface stubs 208, 210, 212 by leveraging JavaScript engine API code units 205, .NET API code units 207, and Java API code units 209, respectively. The JavaScript engine API code units 205, .NET API code units 207, and Java API code units 209 may be source code of the implementation underlying the corresponding API for each language. FIG. 2 depicts a source code repository 202 which maintains the JavaScript engine API code units 205, a source code repository 203 which maintains the .NET API code units 207, and a source code repository 204 which maintains the Java API code units 209. The hooking interface generator 201 accesses the source code repository 202 to create the JavaScript interface stubs 208 based on the JavaScript engine API code units 205. The hooking interface generator 201 accesses the source code repository 203 to create the .NET interface stubs 210 based on the .NET API code units 207. The hooking interface generator 201 accesses the source code repository 204 to create the Java interface stubs 212 based on the Java API code units 209. For instance, the hooking interface generator 201 can download the JavaScript engine API code units 205, .NET API code units 207, and Java API code units 209 from the source code repositories 202, 203, 204, respectively.

Rules 213 for generating the hooking interface stubs 208, 210, 212 based on the corresponding language are attached to (e.g., installed on or otherwise accessible to) the hooking interface generator 201. The rules 213 indicate rules for generating stubs from code units associated with the runtime engine API for each of the languages for which the hooking interface generator 201 generates hooking interfaces. The approach by which the hooking interface generator 201 generates the hooking interface stubs 208, 210, 212 can vary based on the language of the runtime engine API for which the stubs are generated. For instance, the hooking interface generator 201 may process the Java API code units 209 to determine method headers from the code units 209 and construct the corresponding Java interface stubs 212 from the method headers based on a rule(s) for generating hooking interface stubs for the Java API indicated in the rules 213. As another example, the hooking interface generator 201 may process the JavaScript engine API code units 205 to distinguish functions from thunks and construct the JavaScript interface stubs 208 based on identifying the functions and the functions which are returned with thunks based on a rule for generating hooking interface stubs for the JavaScript engine API indicated in the rules 213.

The hooking interface stubs 208, 210, 212 which the hooking interface generator 201 generates for each respective language and language version number may comprise function headers, method headers, etc. for each of the function calls indicated by the corresponding runtime engine API. For instance, the Java interface stubs 212 can include method headers for each of the methods of the Java API indicated in the Java API code units 209. The hooking interface stubs 208, 210, 212 may comprise precompiled headers. For instance, the hooking interface generator 201 can generate header files for the hooking interface stubs 208, 210, 212 which are subsequently precompiled. Source code 220 of the agent 101 (hereinafter referred to as the "agent source code 220") can comprise the implementation of the hooking interface stubs 208, 210, 212 underlying the header files, such as the implementation for creating a hook for each respective target function call.

During the build of the agent 101 module, a compiler 215 compiles the hooking interface stubs 208, 210, 212 and agent source code 220. A linker 217 links the object files generated from compiling the hooking interface stubs 208, 210, 212 and the agent source code 220 to generate the module for the agent 101 which can be deployed. Target function calls of the JavaScript engine API, .NET API, and Java API indicated in the hooking interface stubs 208, 210, 212 are thus locally accessible to the agent 101 via the hooking interfaces 111. The agent 101 can thus interface with any of a CLR, JVM, or JavaScript runtime engine at runtime as a result of accessing the hooking interface stubs 208, 210, 212.

While FIG. 2 depicts the hooking interface stubs 208, 210, 212 as being made available to the agent 101 as a result of static linking, in some implementations, other techniques can be leveraged for loading the hooking interface stubs 208, 210, 212 by the agent 101. For example, the hooking interface stubs 208, 210, 212 can be implemented as one or more external libraries (e.g., shared libraries). The agent 101 may then generate the hooking interfaces 111 by loading the library or libraries which comprise the hooking interface stubs 208, 210, 212 upon load of the agent 101 in a runtime engine.

Figure 3:
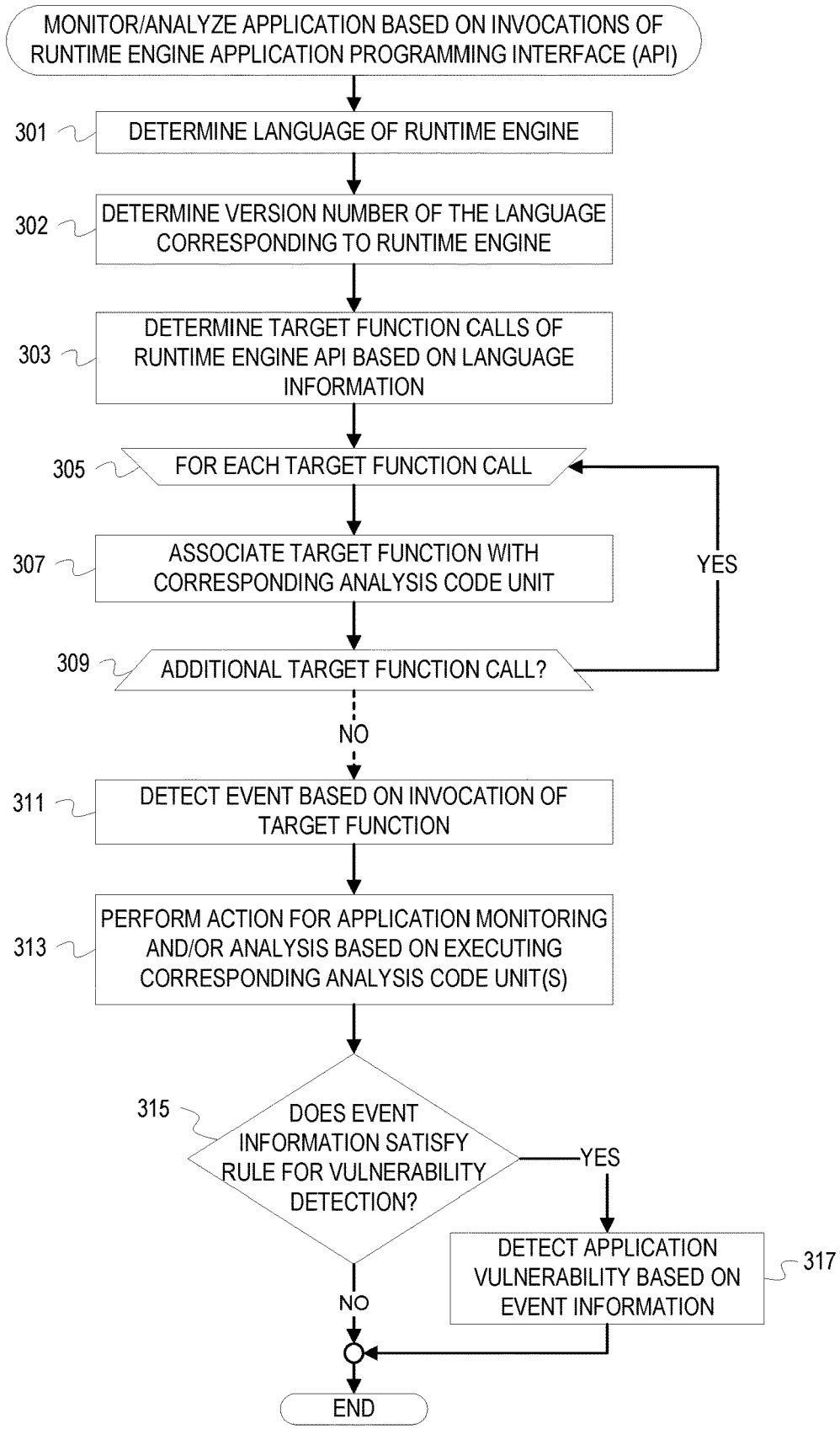
FIG. 3 is a flowchart of example operations for monitoring and analyzing execution of an application based on detecting invocations of a runtime engine API.

FIG. 3 is a flowchart of example operations for monitoring and analyzing execution of an application based on detecting invocations of a runtime engine API. The example operations refer to a hook-based application monitoring agent (hereinafter "agent") as performing the depicted operations for consistency with FIG. 1, although naming of software and program code can vary among implementations. The example operations can be performed after the agent has been loaded into the runtime engine.

At block 301, the agent determines the language associated with the runtime engine (i.e., Java for a JVM, JavaScript for a JavaScript engine, etc.). The agent can determine the language of the runtime engine based on the mechanism by which the agent was loaded into the runtime engine and/or based on execution of stubs maintained by the agent upon loading. For instance, parameters, arguments, etc. included in a command script or instruction to load the agent into the runtime engine may be stored as metadata (e.g., metadata associated with the runtime engine) which the agent can access to determine if certain parameters or arguments have been included. As an example, the agent can determine that the language of the runtime engine is the Java language based on determining that the agent was loaded via an "agentpath" option against the JVM. The agent may also maintain stubs for at least a subset of languages of runtime engines in which the agent can be loaded. The stubs may correspond to functions, methods, etc. which may be invoked upon load of the agent (e.g., by the runtime engine). The agent can determine the language of the runtime engine based on identifying that one or more stubs corresponding to a certain language are executed once the agent is loaded. For example, the agent can maintain JavaScript stubs which facilitate a determination that the agent has been loaded into a JavaScript engine if the JavaScript stubs are executed.

At block 302, the agent determines the version number of the language of the runtime engine and the corresponding runtime engine API. For instance, the agent can determine the version number of the language by calling a function of the API provided by the runtime engine which returns a version number of the language of the runtime engine. The agent can determine the call to issue based on the determined language of the runtime engine. For instance, the agent can call a function of the Java API based on determining that the runtime engine language is Java, call a function of the JavaScript engine API based on determining that the runtime engine language is JavaScript, etc. As another example, heuristics can be implemented to facilitate a determination of the version number of the identified language by the agent based on evidence within the runtime engine which is accessible to the agent.

At block 303, the agent determines target function calls of the runtime engine API on the runtime engine language information (i.e., the language and language version number determined for the runtime engine and runtime engine API). The target function calls are the function calls of the runtime engine API for which the agent should monitor. The agent can maintain an interface for each supported language and language version number which indicates target function calls of the runtime engine API, such as the Java hooking interface 111C described in reference to FIG. 1. The agent can access the interface which was generated for the determined language and language version number of the runtime engine and runtime engine API to determine the corresponding target function calls for which to monitor. Generation of interfaces is further described in reference to FIG. 4.

At block 305, the agent begins associating each of the target function calls of the runtime engine API with at least a first corresponding analysis code unit. Associating target function calls with analysis code units refers to the agent determining API function calls corresponding to events for which it is to monitor and the corresponding analysis code unit(s) to be executed upon detection of each event, such as described in reference to hook creation in FIG. 1. The agent can associate analysis code units for each of the target function calls of the runtime engine API based on the interface. The target function call of the runtime environment API for which the association is being determined is hereinafter referred to as "the target function call."

At block 307, the agent associates the target function call with a corresponding analysis code unit. The agent may have been configured to receive events from the runtime engine upon invocations of the runtime engine API as a result of the agent's load into the runtime engine. The agent thus creates the association such that the agent can execute an analysis code unit upon detection of an event which corresponds to a respective target function call. For instance, the agent may register a callback that accepts one or more parameters indicating information about the event (e.g., event data and/or metadata), such as through the JVM Tool Interface for a target language of Java, where the agent detects an event based on the callback being invoked. As another example, the agent may create a hook which associates the target function with an analysis code unit which handles the event generated from an invocation of the target function (e.g., by determining pointers to the target function and analysis code unit and associating the pointers). The agent thus detects the event based on the invocation of the target function, which triggers execution of the analysis code unit that has been "hooked" to the event. As another example, the agent may create a hook which associates the target function with an event listener, such as based on pointers to the target function and the event listener, where the event listener indicates at least a first event handler to which the event listener directs the event. With reference to FIG. 1, the analysis code unit 117A may be an event handler which is defined for memory allocation events or a callback which is set for memory allocation events, for example.

At block 309, the agent determines if an additional target function call of the runtime engine API is indicated for association with an analysis code unit. The agent can determine if an additional target function call is indicated based on the interface being leveraged. If an additional target function call is indicated, operations continue at block 305. If no additional target function calls are indicated, operations continue at block 311.

At block 311, after the application has begun executing in the runtime engine, the agent detects an event based on an invocation of a target function of the API. During execution of the application in the runtime engine, the runtime engine can invoke the runtime engine API to perform operations for managing application execution which underly the operations performed by the application (e.g., memory allocation, function entry/exit, garbage collection, etc.). Upon an invocation of a target function of the runtime engine API, the agent detects the invocation as an event. For instance, an event listener which "listens" for events which were associated with an analysis code unit (e.g., by hooking events to an analysis code unit which handles the event) can detect the event. As another example, if the hook was created through registration of a callback function, the agent can detect the event based on invocation of the callback.

At block 313, the agent performs an action for application monitoring and/or analysis based on execution of at least a first analysis code units corresponding to the event. The agent maintains one or more analysis code units to be executed upon detection of an event. Analysis code units can be implemented as an event handler(s) to which an event listener implemented by the agent directs events or a callback which is invoked upon "detection" of the event, for example. The agent can obtain information about the event based on detecting the event. For instance, event information may be passed to a callback corresponding to the analysis code unit as a parameter(s) or may be communicated to the agent with the event which is generated. The analysis code units may comprise instructions to generate an indicator of the event corresponding to the invocation of the target function, log the event, determine whether the event is indicative of an application vulnerability, etc. As an example, the agent can execute analysis code units corresponding to the target function call for memory allocation to generate an indicator of the memory allocation event which indicates a source of the memory allocation event, start address and size of the allocated memory, etc.

At block 315, the agent determines if the event information obtained from execution of the application satisfies a rule for vulnerability detection. The agent may maintain a rule(s) for vulnerability detection based on analysis of detected events. The agent may, for instance, maintain a rule that memory allocations initiated by an external source are to be flagged as an application vulnerability which allows for unknown sources to perform memory allocations. The agent can determine if the event information obtained from execution of the application satisfies a rule for vulnerability detection based on evaluating the event information against the vulnerability detection rule(s). For instance, the agent can evaluate an event indicator, the information about the event which the agent obtained, etc. against the vulnerability detection rule(s). If the event information satisfies a rule for vulnerability detection, operations continue at block 317. If the event information does not satisfy a rule for vulnerability detection, operations are complete.

At block 317, the agent detects an application vulnerability based on the analysis of the event information. The agent may generate a notification indicating the application vulnerability, the event information obtained during execution of the application related to the application vulnerability, etc. For instance, if a vulnerability related to memory allocation by an external source is detected, the notification can include the memory address associated with the detected vulnerability.

Figure 4:
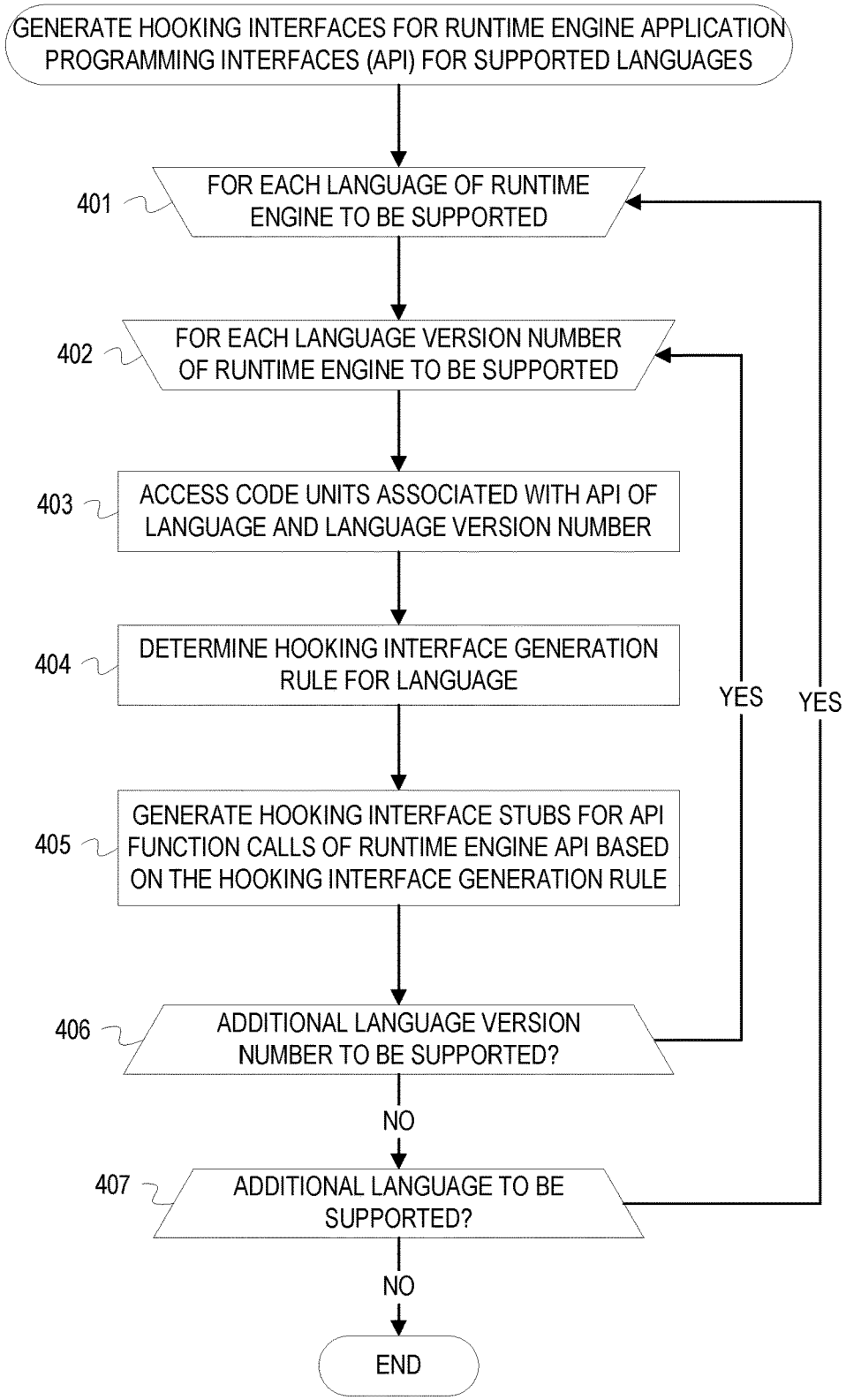
FIG. 4 is a flowchart of example operations for generating hooking interfaces for a plurality of languages and language version numbers.

FIG. 4 is a flowchart of example operations for generating hooking interfaces for a plurality of languages and language version numbers. A hooking interface is an interface generated for a particular language and language version number of a runtime engine and associated API which indicates target function calls for which an agent deployed to the runtime engine is to monitor, such as the hooking interfaces 111 described in reference to FIG. 1. The example operations refer to an API hooking interface generator as performing the example operations for consistency with FIG. 2, although naming of software and program code can vary among implementations.

At block 401, the API hooking interface generator begins creating a hooking interface for each language of a runtime engine and associated API to be supported. The API hooking interface generator can create a hooking interface based on any language of a runtime engine providing an API for which runtime application monitoring and analysis via evaluating function calls of the runtime engine API is supported. For instance, the API hooking interface generator can generate hooking interfaces for an API for interfacing with a JVM, an API for interfacing with a JavaScript engine, etc. The language for which the hooking interface(s) is currently being created is hereinafter referred to as the "current language."

At block 402, the API hooking interface generator begins generating a hooking interface for each version number of the current language. The API hooking interface generator may maintain a list of version numbers of the current language for which an API hooking interface is to be supported. For instance, if the current language is Java, the API hooking interface generator may generate a hooking interface for versions 1.6 and 1.7 of Java.

At block 403, the API hooking interface generator accesses code units associated with the runtime engine API of the current language and language version number. The API hooking interface generator may have access to a source code repository which stores the code units associated with the runtime engine API of the current language and language version number. For instance, the API hooking interface generator can download the code units associated with the API of the current language and version number from the respective source code repository.

At block 404, the API hooking interface generator determines a hooking interface generation rule for the current language. Hooking interface generation rules can be attached to the API hooking interface generator. The hooking interface generation rules establish rules for creating hooking interfaces for function calls of a runtime engine API based on each potential language of the runtime engine. For instance, the API hooking interface generator can maintain rules for generating a Java hooking interface, a JavaScript hooking interface, etc. The hooking interface generation rules established for the current language may comprise rules for determining function names, return values, parameters, etc. indicated in function calls of the API of the current language and version number based on processing the corresponding code units. The rules for determining function calls indicated in code units of the API to include in the hooking interface for the current language and version number may be based on representations of routines and/or subroutines per the syntax of the current language. For example, the rules for generating a Java hooking interface may indicate that the API hooking interface generator should create the Java hooking interface based on identifying method headers defined for the Java API from the analysis of the code units of the Java API. As another example, the rules for generating a JavaScript hooking interface may indicate that the API hooking interface generator should create the JavaScript hooking interface based on analyzing the code units of the JavaScript engine API to distinguish functions from functions returned from thunks.

At block 405, the API hooking interface generator generates hooking interface stubs (i.e., method stubs for API function calls of the current language) for the runtime engine API based on the determined hooking interface generation rule. The API hooking interface generator can generate stubs for each of the function calls of the API for the current language and version number based on the hooking interface generation rule and the code units associated with the API. For instance, the API hooking interface generator may process the source code associated with the API implementation which was downloaded from the source code repository to identify method headers, functions, etc. and generate corresponding stubs for the identified method headers or functions. The API hooking interface generator may create a header file for the hooking interface for the current language and version number, where the agent implements the functionality underlying each of the target functions indicated in the hooking interface header file (e.g., the implementation of creation of hooks).

At block 406, the API hooking interface generator determines if an additional version number of the current language remains for creation of a hooking interface. If an additional version number of the current language remains, operations continue at block 402. If no additional version numbers of the current language remain, operations continue at block 407.

At block 407, the API hooking interface generator determines if an additional language remains for generation of a hooking interface. If an additional language remains, operations continue at block 401. If no additional languages remain, operations are complete, and the hooking interface stubs generated for each language and language version number can be made accessible to an application monitoring agent. For instance, the hooking interface stubs can be compiled and linked with code units of the agent or provided as a shared library which the agent loads at runtime.

Figure 5:
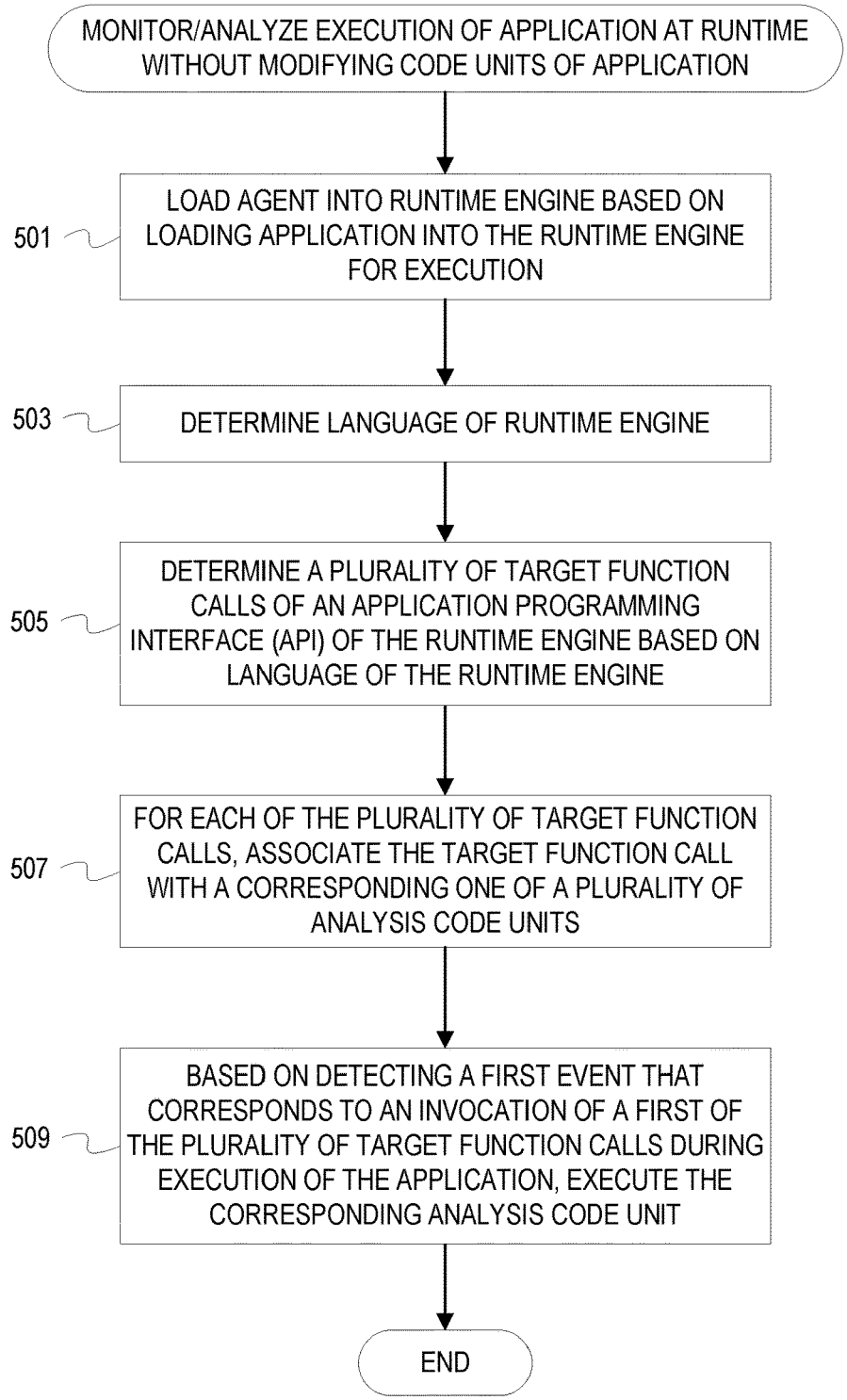
FIG. 5 is a flowchart of example operations for runtime monitoring and analysis of an application without modifying code units of the application.

FIG. 5 is a flowchart of example operations for runtime monitoring and analysis of an application without modifying code units of the application. The example operations refer to a hook-based application monitoring agent (hereinafter "agent") as performing the depicted operations for consistency with FIG. 1, although naming of software and program code can vary among implementations.

At block 501, based on loading an application into a runtime engine for execution, the agent is loaded into the runtime engine. The agent is loaded into the same process as that in which the runtime engine is launched for execution of the application. The agent can be loaded based on execution of an instruction to load or include a module in the runtime engine, such as a command script executed via a command line which specifies the agent as a module name. For instance, the agent may be loaded based on specifying the agent as an argument or parameter in the load command (e.g., by the agent module name). As another example, the agent can be loaded by setting values of certain properties for loading the agent. For example, the agent can be loaded into a JVM by setting a "libagent" property to true for loading of a native agent.

At block 503, the agent determines a language of the runtime engine. The agent can determine the language of the runtime engine based on analysis of metadata associated with the runtime engine. For instance, the agent can determine the language of the runtime engine based on a parameter, argument, or property associated with the instruction to load the agent which was stored as metadata. Alternatively or in addition, the agent can maintain stubs for supported runtime engine languages. The stubs may be stubs which correspond to functions or methods which can be invoked as a result of loading the agent into the runtime engine. The agent can determine the language of the runtime engine based on determining that stubs corresponding to a certain language executed upon loading the agent.

At block 505, the agent determines a plurality of target function calls of an API of the runtime engine based on the determined language of the runtime engine. The agent maintains indications of target function calls of the API for which it is to monitor for each potential language of the runtime engine (e.g., Java for a JVM, .NET for a CLR, etc.). For instance, the agent may maintain one or more interfaces which indicate target function calls for each of the potential target languages. The agent determines the target function calls for which to monitor based on the language of the runtime engine which was determined at block 503.

At block 507, for each target function call of the plurality of target function calls, the agent associates the target function call with a corresponding one of a plurality of analysis code units. The agent also maintains analysis code units for handling events detected based on invocations of the runtime engine API. Analysis code units can be implemented as event handlers, callbacks, etc. The agent can associate a target function call with the corresponding analysis code unit such that detection of the event corresponding to the target function call triggers execution of the analysis code unit based on the implementation of the analysis code unit. For instance, the agent can register the callback corresponding to the analysis code unit. As another example, the agent can "hook" the event corresponding to the target function call to an event listener function or to the analysis code unit which handles the event (e.g., based on pointers to the target function call and the event listener function/ analysis code unit).

At block 509, based on detecting a first event that corresponds to an invocation of a first of the plurality of target function calls during execution of the application, the agent executes the corresponding analysis code unit. Events can be detected based on an invocation of the corresponding event handler or an invocation of the corresponding callback, for example. The analysis code unit which executes as a result of detecting the event can comprise instructions to indicate that the event occurred (e.g., by generating a notification), log the event, determine if the application comprises a vulnerability based on evaluating data and/or metadata associated with the event, etc. The agent can thus monitor, analyze, or otherwise evaluate execution of the application at runtime based on execution of the analysis code unit.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 403 and 404 can be performed in parallel or concurrently for each indicated function call. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
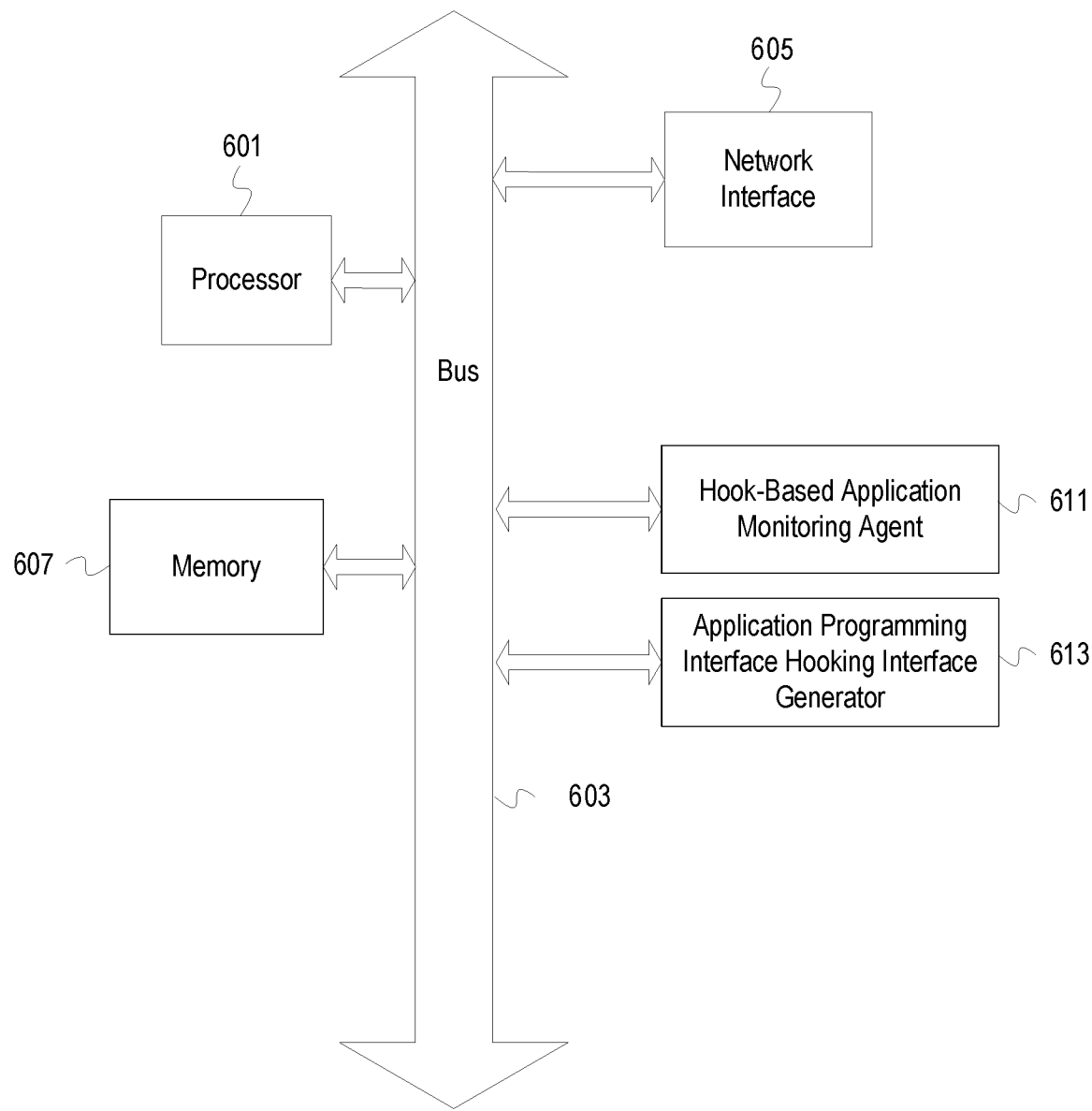
FIG. 6 depicts an example computer system with a hook-based application monitoring agent and an API hooking interface generator.

FIG. 6 depicts an example computer system with a hook-based application monitoring agent and an API hooking interface generator. The computer system includes a processor 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, Hyper-Transport® bus, InfiniBand® bus, NuBus, etc.) and a network interface 605 (e.g., a Fiber Channel interface, an Ethernet interface, an internet small computer system interface, SONET interface, wireless interface, etc.). The system also includes hook-based application monitoring agent 611 and API hooking interface generator 613. The hook-based application monitoring agent 611 monitors and analyzes execution of the application based on evaluating invocations of target functions of a runtime engine API which it detects as events. The API hooking interface generator 613 generates hooking interfaces for each supported runtime engine API language and version number of to facilitate language-independent evaluation of invocations of target function calls of the runtime engine API. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for language-agnostic application monitoring and analysis at runtime by an agent loaded into a runtime engine in which the application executes without modifying code units of the application as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

A method comprises, based on loading an application into a runtime engine, loading an agent into the runtime engine. The agent determines a language of the runtime engine. The agent determines a plurality of target function calls of an application programming interface (API) of the runtime engine based, at least in part, on the language of the runtime engine. For each target function call of the plurality of target function calls of the API of the runtime engine, the agent associates the target function call with a corresponding one of a plurality of analysis code units.

Based on the agent detecting a first event that corresponds to an invocation of a first of the plurality of target function calls during execution of the application, the corresponding one of the plurality of analysis code units is executed.

The agent detecting the first event comprises the agent obtaining at least one of data and metadata of the first event.

The method further comprises the agent evaluating the at least one of the obtained data and metadata of the first event based on executing the corresponding one of the plurality of analysis code units.

The method further comprises the agent detecting a first vulnerability of the application based, at least in part, on evaluating the at least one of the obtained data and metadata of the first event.

The method further comprises the agent determining a version number of the language of the runtime engine, wherein determining the plurality of target function calls of the API of the runtime engine is also based on the version number of the language of the runtime engine.

Associating the target function call with the corresponding one of the plurality of analysis code units comprises registering a callback function, wherein the callback function comprises the corresponding one of the plurality of analysis code units.

Associating the target function call with the corresponding one of the plurality of analysis code units comprises hooking an event corresponding to the target function call with the corresponding one of the plurality of analysis code units, wherein the corresponding one of the plurality of analysis code units comprises an event handler.

The method further comprises determining a generation rule for generating a plurality of method stubs based on the language of the runtime engine, wherein the plurality of method stubs correspond to the plurality of target function calls, generating the plurality of method stubs based on the generation rule and code units associated with the API, and making accessible the plurality of method stubs to the agent, wherein determining the plurality of target function calls of the API is also based on the plurality of method stubs.

Generating the plurality of method stubs comprises generating a header file for the plurality of method stubs, wherein the header file comprises a precompiled header file.

The agent and the application execute in parallel or concurrently.

One or more non-transitory machine-readable media comprise program code for monitoring execution of an application in a runtime engine by an agent, the program code to load the agent into the runtime engine based on load of the application into the runtime engine. A language of the runtime engine is determined based, at least in part, on the load of the agent. At least a first target function of an application programming interface (API) of the runtime engine is determined based, at least in part, on the determined language. An indication of a first event corresponding to an invocation of the first target function is associated with a first analysis code unit, wherein the association causes execution of the first analysis code unit based on detection of the first event. Based on detection of the first event during execution of the application, the first analysis code unit is executed.

The non-transitory machine-readable media further comprise program code to evaluate the first event based on execution of the first analysis code unit.

The non-transitory machine-readable media further comprise program code to determine a version number of the language of the runtime engine based on the load of the agent, wherein the determination of the first target function call is also based on the version number of the language.

The first analysis code unit comprises a callback function, wherein the program code to associate the indication of the first event with the first analysis code unit comprises program code to register the callback function.

The program code to associate the indication of the first event with the first analysis code unit comprises program code to hook the indication of the first event with an event handler, wherein the event handler comprises the first analysis code unit.

An apparatus comprises a processor and a machine-readable medium having first program code and agent program code. The first program code is executable by the processor to cause the apparatus to load the agent program code into a runtime engine based on load of an application into the runtime engine. The agent program code is executable in the runtime engine to determine a language of the runtime engine based, at least in part, on loading of the agent program code. A plurality of target function calls of an application programming interface (API) of the runtime engine is determined based, at least in part, on the language of the runtime engine. For each target function call of the plurality of target function calls of the API of the runtime engine, the target function call is associated with a corresponding one of a plurality of analysis code units. Based on detection of a first event that corresponds to an invocation of one of the plurality of target function calls during execution of the application, the corresponding one of the plurality of analysis code units is executed.

The apparatus further comprises agent program code executable in the runtime engine to evaluate at least one of data and metadata of the first event based on execution of the corresponding one of the plurality of analysis code units, wherein the agent program code executable in the runtime engine to detect the first event comprises agent program code executable in the runtime engine to obtain the at least one of data and metadata of the first event.

The apparatus further comprises agent program code executable in the runtime engine to determine a version number of the language of the runtime engine, wherein the agent program code executable in the runtime engine to determine the plurality of target function calls of the API comprises agent program code executable in the runtime engine to determine the plurality of target function calls of the API based on the version number of the language of the runtime engine.

The agent program code executable in the runtime engine to associate the target function call with the corresponding one of the plurality of analysis code units comprises agent program code executable in the runtime engine to register a callback function, wherein the callback function comprises the corresponding one of the plurality of analysis code units.

The agent program code executable in the runtime engine to associate the target function call with the corresponding one of the plurality of analysis code units comprises agent program code executable in the runtime engine to hook an event corresponding to the target function call with the corresponding one of the plurality of analysis code units, wherein the corresponding one of the plurality of analysis code units comprises an event handler.

What is claimed is:

1. A method comprising:
based on loading an application into a runtime engine, loading an agent into the runtime engine;
determining, by the agent, a language of the runtime engine;
determining, by the agent, a plurality of target functions of an application programming interface (API) of the runtime engine based, at least in part, on the language of the runtime engine;
for each target function of the plurality of target functions of the API of the runtime engine, the agent associating the target function with a corresponding one of a plurality of analysis code units of the agent, wherein associating the target function with the analysis code unit causes execution of the analysis code unit based on invocation of the target function by the runtime engine;
based on the runtime engine invoking a first of the plurality of target functions during execution of the application, detecting, by the agent, a first event that corresponds to the invocation of the first target function; and
executing the corresponding one of the plurality of analysis code units that was associated with the target function.

2. The method of claim 1, wherein the agent detecting the first event comprises the agent obtaining at least one of data and metadata of the first event.

3. The method of claim 2, further comprising the agent evaluating the at least one of the obtained data and metadata of the first event based on executing the corresponding one of the plurality of analysis code units.

4. The method of claim 3, further comprising the agent detecting a first vulnerability of the application based, at least in part, on evaluating the at least one of the obtained data and metadata of the first event.

5. The method of claim 1, further comprising the agent determining a version number of the language of the runtime engine, wherein determining the plurality of target functions of the API of the runtime engine is also based on the version number of the language of the runtime engine.

6. The method of claim 1, wherein associating the target function call with the corresponding one of the plurality of analysis code units comprises registering a callback function, and wherein the callback function comprises the corresponding one of the plurality of analysis code units.

7. The method of claim 1, wherein associating the target function with the corresponding one of the plurality of analysis code units comprises hooking an event corresponding to the target function with the corresponding one of the plurality of analysis code units, and wherein the corresponding one of the plurality of analysis code units comprises an event handler.

8. The method of claim 1, further comprising:
determining a generation rule for generating a plurality of method stubs based on the language of the runtime engine, wherein the plurality of method stubs correspond to the plurality of target functions;
generating the plurality of method stubs based on the generation rule and code units associated with the API; and
making accessible the plurality of method stubs to the agent, wherein determining the plurality of target functions of the API is also based on the plurality of method stubs.

9. The method of claim 8, wherein generating the plurality of method stubs comprises generating a header file for the plurality of method stubs, and wherein the header file comprises a precompiled header file.

10. The method of claim 1, wherein the agent and the application execute in parallel or concurrently.

11. One or more non-transitory machine-readable media comprising program code for monitoring execution of an application in a runtime engine by an agent, the program code to:
load the agent into the runtime engine based on load of the application into the runtime engine;
determine a language of the runtime engine based, at least in part, on the load of the agent;
determine at least a first target function of an application programming interface (API) of the runtime engine based, at least in part, on the determined language of the runtime engine;
associate the first target function with a first analysis code unit, wherein the association causes execution of the first analysis code unit based on invocation of the first target function by the runtime engine; and
based on detection of a first event that corresponds to invocation of the first target function by the runtime engine during execution of the application, execute the first analysis code unit.

12. The non-transitory machine-readable media of claim 11, further comprising program code to evaluate the first event, wherein evaluation of the first event is based on execution of the first analysis code unit.

13. The non-transitory machine-readable media of claim 11, further comprising program code to determine a version number of the language of the runtime engine based on the load of the agent, wherein the determination of the first target function is also based on the version number of the language.

14. The non-transitory machine-readable media of claim 11, wherein the first analysis code unit comprises a callback function, and wherein the program code to associate the first target function with the first analysis code unit comprises program code to register the callback function.

15. The non-transitory machine-readable media of claim 11, wherein the program code to associate the first target function with the first analysis code unit comprises program code to hook the first target function with an event handler, and wherein the event handler comprises the first analysis code unit.

16. An apparatus comprising:
a processor; and
a machine-readable medium having first program code and agent program code,
the first program code executable by the processor to cause the apparatus to load the agent program code into a runtime engine based on load of an application into the runtime engine;
the agent program code executable in the runtime engine to,
determine a language of the runtime engine based, at least in part, on loading of the agent program code;
determine a plurality of target functions of an application programming interface (API) of the runtime engine based, at least in part, on the language of the runtime engine;
for each target function of the plurality of target functions of the API of the runtime engine, associate the target function with a corresponding one of a plurality of analysis code units, wherein association of the target function with the analysis code unit causes execution of the analysis code unit upon invocation of the target function by the runtime engine;
based on the runtime engine invoking a first of the plurality of target functions during execution of the application, detect a first event that corresponds to the invocation of the target function; and
execute the corresponding one of the plurality of analysis code units that was associated with the target function.

17. The apparatus of claim 16, further comprising agent program code executable in the runtime engine to evaluate at least one of data and metadata of the first event based on execution of the corresponding one of the plurality of analysis code units, wherein the agent program code executable in the runtime engine to detect the first event comprises agent program code executable in the runtime engine to obtain the at least one of data and metadata of the first event.

18. The apparatus of claim 16, further comprising agent program code executable in the runtime engine to determine a version number of the language of the runtime engine, wherein the agent program code executable in the runtime engine to determine the plurality of target functions of the API comprises agent program code executable in the runtime engine to determine the plurality of target functions of the API based on the version number of the language of the runtime engine.

19. The apparatus of claim 16, wherein the agent program code executable in the runtime engine to associate the target function with the corresponding one of the plurality of analysis code units comprises agent program code executable in the runtime engine to register a callback function, wherein the callback function comprises the corresponding one of the plurality of analysis code units.

20. The apparatus of claim 16, wherein the agent program code executable in the runtime engine to associate the target function with the corresponding one of the plurality of analysis code units comprises agent program code executable in the runtime engine to hook an event corresponding to the target function with the corresponding one of the plurality of analysis code units, wherein the corresponding one of the plurality of analysis code units comprises an event handler.

\* \* \* \* \*